J. C. FOX.
TANK REGISTERING GAUGE.
APPLICATION FILED MAR. 3, 1921.
1,431,516. Patented Oct. 10, 1922.
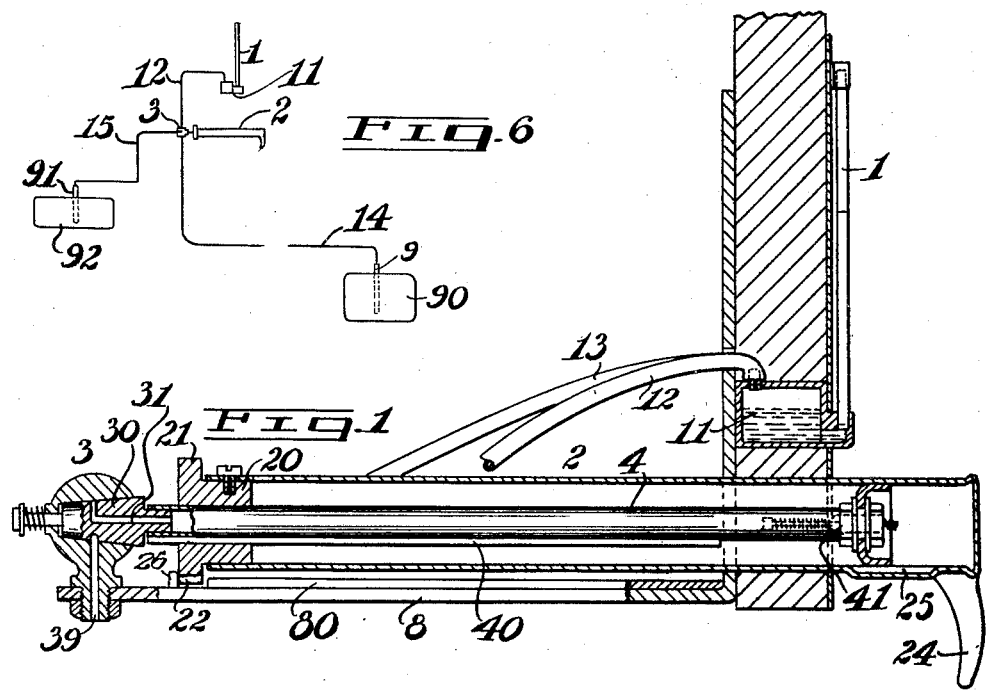
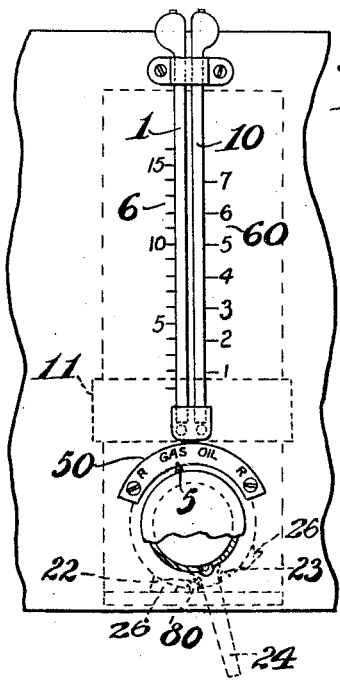
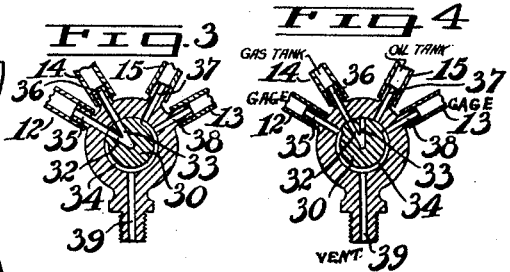
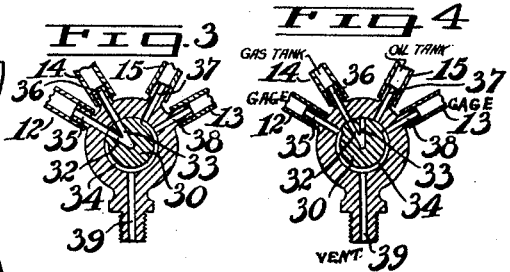
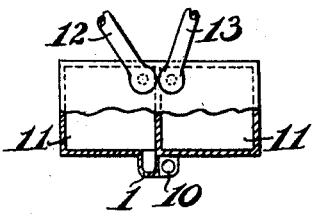
INVENTOR
Joseph C. Fox
BY
H.L. & C.L. Reynolds
ATTORNEY Patented Oct. 10, 1922.

1,431,516

UNITED STATES PATENT OFFICE.

JOSEPH C. FOX, OF SEATTLE, WASHINGTON.

TANK-REGISTERING GAUGE.

Application filed March 3, 1921. Serial No. 449,482.

*To all whom it may concern:*

Be it known that I, JOSEPH C. FOX, a citizen of the United States of America, and resident of the city of Seattle, in the county of King and State of Washington, have invented certain new and useful Improvements in Tank-Registering Gauges, of which the following is a specification.

My invention relates to gauges of the type intended for indicating at some distant point and at a level different from that of a tank or other holder, the depth or quantity of liquid in said tank holder.

My invention is particularly designed for use upon automobiles for indicating at a point visible to the driver while in his seat, the amount of gasolene in the tank and the amount of oil in the crank case.

The construction of an apparatus which includes my invention embodied in its preferred form is illustrated in the accompanying drawings and the same device will be hereinafter described. The parts and combinations of parts which I believe to be new and upon which I desire to secure a patent will be particularly defined in the claims terminating this specification.

Figure 1 is a section taken through the pump, the valve and the gauge.

Figure 2 is a front view of the gauge showing the operating end of the pump.

Figures 3 and 4 are transverse sections taken through the valve, the two figures showing the valve in different positions.

Figure 5 is a plan view of the storage chambers of the gauge with parts broken away and in section.

Fig. 6 shows diagrammatically the relative position of the parts.

My present invention is an improvement upon the device shown in my application for patent for a liquid indicator for automobile tanks, filed in the United States Patent Office April 1, 1920, Serial No. 370,379.

In the present device it is sought to simplify the parts and the manner of their operation, to provide automatic guards against improper operation, and to adapt the device to indicate the contents of more than one tank or container. The present device is designed to be connected with a distant tank or container through the use of a tube which communicates freely with the lower levels of the liquid in said tank or container. In this respect it is similar to the device shown and described in said application for Patent No. 370,379, and this tank and its tube have not been herein shown, except diagrammatically in Figure 6.

This present device, similar to that shown in said application, employs an indicating or gauge tube or tubes and a pump for producing air under pressure in the tank tube to thereby clear said tube of all liquid, as a preliminary to taking a reading. It is of course to be understood that any means for supplying air to the tank tube under pressure sufficient to expel the liquid therein, may be employed and any such means is contemplated by the pump element.

In the present device I show two independent indicating or gauge tubes 1 and 10 with their accompanying liquid holders 11, a single pump 2 and controlling valve 3 and two tubes 14 and 15 leading from said valve to the tanks or containers to be gaged, as 90 and 92.

The gauges each consist of an indicating tube, as 1 and 10, each connected at its lower end with the lower levels of its respective liquid storage tank or container 11 and vented at their top. The pipes 12 and 13 lead from the top of tanks 11, each to its respective port of the controlling valve 3.

The valve 3 is of the plug type, the plug 30 having an axial bore or port 31 to which the air from the pump is delivered. It also has two radially positioned ports 32 and 33 with their outer ends angularly separated and both communicating with the axial port 31. The casing also has two pairs of ports 35 and 36 connecting with the gauge connecting tube 12 and with its complemental tube 14 leading to one of the tanks to be gaged, and the other pair 37 and 38 connecting respectively with tubes 15 and 13 which lead to another tank to be gaged and its indicating or gauge tube 10. The valve casing also has a venting port 39, and the plug a venting port 34, the latter consisting of a peripherally extending groove.

The hollow piston stem, 4, has a rib 40 which fits a groove in the cylinder head 20, whereby there can be no turning between the piston and cylinder. The head 20 has a projecting flange 21 which has limiting stops 26 and two grooves 22 and 23, positioned, when the cylinder is in proper angular position, to engage with a fixed rib 80 carried by the supporting bracket or frame 8 to thereby prevent turning of the cylinder. The innermost position of the pump cylinder carries the flange 21 beyond the inner end of the rib 80, in which position the pump cylinder may be turned so as to register either of its ports 32, 33 with the ports 35, 36, 37 and 38 of the valve casing. The pump cylinder cannot, however, be reciprocated unless it is positioned to aline one of its grooves 22 or 23 with the rib 80 and these are positioned so that the valve is then positioned to register its port 32 with port 36 of the casing or port 33 with port 37 of the casing. In these positions the air delivered by the pump is discharged into one or the other of the tubes 14 or 15 to thereby expel any liquid contained in tank tubes 9 and 91.

While the valve is in the above position, the port which connects with the gauge tube, as 12, is vented through the groove 34 and port 39, as is also the other gauge through port 38. In order to obtain the gauge reading it is only necessary to turn the pump cylinder slightly further in the same direction to bring the ports 32 and 33 into registry respectively with the ports 35 and 36 of the casing. The air in the tank tube is then forced into the gauge and raises the level of the liquid therein in proportion to the depth of liquid in the tank. To gauge the other tanks the same operations are performed, the pump cylinder being however turned in the other way.

Where two or more indicating or gauge tubes are used I contemplate employing indicating liquids therein of contrasting appearance or in an analogous way to secure contrasts in appearance between different gauges. This may be done by coloring the liquids, as one red and the other blue, or one colored and the other clear, or by coloring one or both of the gauge glasses.

To correctly indicate the proper angular position of the pump cylinder, a pointer 5, carried by the pump cylinder, is placed to conform to the indication of a scale 50. Alongside of the gauge glasses 1 and 10 are scales 6 and 60, calibrated to indicate in the chosen units.

The pump piston is provided with a check valve, as is indicated at 41, and the pump cylinder with a handle as 24. The cylinder is also provided with a bleeding or by-pass groove 25, which frees the compressed air left in the cylinder at the completion of the stroke.

In the above device it has been made impossible to reciprocate the pump except when it is connected to discharge air only to one or the other of the tank tubes. There is no possibility of blowing air under pressure into the gauge glasses to thereby vitiate their readings.

What I claim as my invention is:

1. A device of the character described having a tank tube, an air pressure operated gauge, connecting tubes, a pump as source of supply of air under pressure, a valve containing ports adapted in one position to vent the gauge and connect the pump with the tank tube and in another position to connect the tank tube with the gauge, the movable member of said valve being connected with the pump to be turned by twisting of the pump and means governed by the relative angular position of pump barrel and piston relative to their common axis whereby to control the functioning of the pump.

2. A device of the character described having a tank tube, an air pressure operated gauge, connecting tubes, a pump as source of supply of air under pressure, a valve containing ports adapted in one position to vent the gauge and connect the pump with the tank tube and in another position to connect the tank tube with the gauge, the movable member of said valve being connected with the pump to be turned by twisting of the pump, and a stop to prevent pumping action of the pump except when its discharge is disconnected from the gauge.

3. A device of the character described having a tank tube, an indicating tube, connecting tubes, a pump as source of supply of air under pressure, a valve containing ports adapted in one position to vent the indicating tube and connect the pump with the tank tube and in another position to connect the tank tube with the indicating tube, the movable member of said valve being connected with the pump to be turned by twisting of the pump, a rib extending alongside of the pump, a flange carried by the pump and adapted to engage the end of said rib to prevent reciprocation of the pump, said flange having grooves therein adapted to receive said rib to permit reciprocation of the pump and angularly positioned to then hold the valve in connection with one or the other of the tank tubes and disconnected from the indicating tube.

4. In a device for gaging the liquid contents of a plurality of tanks, a pneumatically actuated gauge, an air distributing valve, a separate tube leading from said valve to each tank, a tube connecting the valve with the gauge, a pump as a source of air under pressure, said valve having a rotatable plug connected to be turned by the pump and having a port receiving the pump discharge, the pump casing having separate ports connecting with the tubes leading to each tank, another connecting with the tube leading to the gauge and another acting as a free vent, and the plug having a venting groove adapted to connect the ports leading to the gauge with the vent and another port adapted in different positions to connect the air receiving port with either of the tank tubes and in other positions to connect either of the tank tubes with its gauge.

5. In a device for gaging the liquid contents of a plurality of tanks, a pair of pneumatically actuated gauges, an air pump, an air distributing valve having a casing provided with a port for each tank, one for each gauge and a venting port, a plug in said casing having a port connecting with the pump and receiving the air therefrom, a pair of ports connected with said air receiving port and adapted to connect either tank port with its gauge port and a venting port adapted to connect either gauge with the venting port of the casing, and means for preventing operation of the pump when the pump is connected with either gauge.

6. In a device of the character described having a tank tube, a pneumatically opertive plug operatively connected with the gauge, a pump as a source of supply of air under pressure, a valve inserted in said connecting tube and operatively connected with the pump, said valve having ports adapted when the valve is adjusted in one position to supply air delivered by the pump to the tank tube, to cut off the gauge from said air supply, and to vent the air in the gauge, pump locking means limiting the reciprocation of the pump to this position of the valve, said valve being adjustable by the pump to connect the gauge with the tank tube.

7. In a device of the character described, a pump, a distributing valve having a rotatative plug operatively connected with the pump and having a central bore for the discharge of the air from the pump, air distributing ports extending from said central bore to the periphery, and a peripheral groove alined with the said air distributing port, a casing having ports peripherally alined with the ports in the plug and comprising a venting port, a gauge connection port and a tank connection port adapted to be connected by the air supply port of the plug and the venting groove of the plug being adapted to connect the gauge connection port and the venting port of the casing when the said air supply ports of the plug are connected only with the tank port.

8. In a device of the character described, a pair of tank pipes, a pair of gauges, a means for supplying air under pressure, a distributing valve having a rotative plug provided with a bore for the reception of said air under pressure and terminating at its periphery and also having a segment groove in its periphery alined with said port, the valve casing having two pairs of ports adapted to register with said port of the plug, the adjacent ports of the two pairs being designed for connection with different chambers which are to be gaged and the outer ports of the two pairs being designed for connecting each with its respective gauge, and a venting port placed opposite its other ports and in communication with the peripheral groove in the plug and by said groove being connectible with the gauge ports of the casing.

9. A plurality of tanks to be gaged, a like number of gauges, a tube connecting each tank with its gauge, a single distributing valve adapted to connect and disconnect each gauge with its tank and also in other positions to vent each gauge and connect its tank with a source of air under pressure, and means controlled by the setting of said valve to prevent supplying air under pressure to the tank when the gauge is connected therewith.

10. A device of the character described having a tank tube, an air pressure operated gauge, connecting tubes, a pump as source of supply of air under pressure, a valve containing ports adapted in one position to vent the gauge and connect the pump with the tank tube and in another position to connect the tank tube with the gauge, and means preventing operation of the pump when its delivery is connected with the indicating tube.

Signed at Seattle, King County, Washington, this 7th day of December, 1920.

JOSEPH C. FOX.